United States Patent [19]
Kirchner

[11] 3,764,694
[45] Oct. 9, 1973

[54] ANTICOCCIDIOSIS METHOD AND COMPOSITIONS
[75] Inventor: Frederick K. Kirchner, Bethlehem, N.Y.
[73] Assignee: Sterling Drug Inc., New York, N.Y.
[22] Filed: Sept. 29, 1970
[21] Appl. No.: 76,621

Related U.S. Application Data
[62] Division of Ser. No. 826,685, May 21, 1969, Pat. No. 3,651,057.

[52] U.S. Cl. .................................................. 424/285
[51] Int. Cl............................................. A61k 27/00
[58] Field of Search................. 260/240 A; 424/285

[56] References Cited
UNITED STATES PATENTS
3,290,213  12/1966  Carron........................... 260/240 A

*Primary Examiner*—Sam Rosen
*Attorney*—Elmer J. Lawson, B. Woodrow Wyatt, Thomas L. Johnson, Robert K. Bair, William G. Webb, Frederik W. Stonner, Roger T. Wolfe and Lynn T. Fletcher

[57] ABSTRACT

A series of 5-nitro-2-furaldehyde benzene-,α-toluene-, halobenzene- and alkylbenzenesulfonylhydrazones, useful for preventing and suppressing coccidiosis in poultry, are prepared by the condensation of 5-nitrofuraldehyde with the appropriate sulfonylhydrazide.

6 Claims, No Drawings

ANTICOCCIDIOSIS METHOD AND COMPOSITIONS

This application is a division of my pending application Ser. No. 826,685, filed May 21, 1969, now U.S. Pat. No. 3,651,057.

This invention relates to compounds, methods, and compositions useful in the prevention and suppression of coccidiosis in poultry.

Coccidiosis, a disease of great economic importance because of its epidemic nature and its destructiveness to poultry, is caused by protozoan organisms known as coccidia, in particular, by certain species of the genus Eimeria. Coccidia gain access to the host by way of ingested food, drinking water, or soil contaminated with oocysts which are found in fecal droppings of fowl harboring the parasites. The coccidia multiply in the gastro-intestinal tract and erode the epithelial tissues of the cecum and intestines, causing hemorrhage, weakness, emaciation, and digestive disturbances. The fowl which survive severe infections are left in a state of debilitation which substantially reduces their market value.

Of the numerous remedies which have been suggested for the control of coccidiosis, many are too inefficient, prohibitively expensive, or too toxic for prophylactic administration. Moreover, with the previously available remedies there may be encountered such metabolic difficulties as poisoning of the hematopoietic system and a subsequent reduction in the number of red and white blood cells, adverse effect on fertility, color, taste, or odor of eggs produced by the birds, and unpalatability of the flesh of the birds. The need for new and improved means for controlling coccidial infections in poultry has therefore remained a serious problem in the poultry industry.

It is an object of this invention to provide novel compounds which are useful as anticoccidial agents when administered to poultry in prophylactic quantities. It is another object of this invention to provide novel feed compositions useful for the prevention and suppression of coccidiosis in poultry. It is still another object of this invention to provide a new and useful method for the control of coccidiosis in poultry.

In accordance with the present invention I have discovered that coccidiosis in poultry can be prevented and suppressed by administering to the poultry, preferably in combination with the poultry feed, a small quantity of the compound of the formula I,

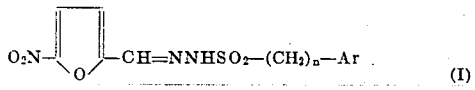

(I)

where $n$ is zero or one and where Ar is a member of the group consisting of phenyl and phenyl substituted by one to three members of the group consisting of halogen and lower-alkyls of one to four carbon atoms.

The halogen substituents in Ar can be any of fluoro, chloro, bromo, and iodo. Because of the ready availability of starting materials the preferred halogen substituents for the purposes of this invention are fluoro, chloro, and bromo.

The lower-alkyl substituents in Ar can be any lower-alkyls of one to four carbon atoms, including methyl, ethyl, propyl, isopropyl, butyl, sec-butyl, isobutyl, and tert-butyl.

The compounds of Formula I of this invention can be prepared by heating a solution of 5-nitro-2-furaldehyde, the appropriate sulfonylhydrazide, a catalytic amount of acetic acid and ethanol at a temperature in the range of 40°–80°C. The crystalline materials produced by this reaction can be purified by recrystallisation from methanol or ethanol.

Alternatively, the compounds of Formula I can be prepared from 5-nitro-2-furaldehyde diacetate, which hydrolyzes to 5-nitro-2-furaldehyde under the reaction conditions; thus, in refluxing aqueous ethanol containing sulfuric acid 5-nitro-2-furaldehyde diacetate can be condensed with the appropriate sulfonylhydrazide to form the compounds of Formula I.

The sulfonylhydrazides referred to above are a well-known class of compounds, which are commercially available or which can be prepared from hydrazine and the appropriate sulfonyl chloride. These sulfonyl chlorides are also well-known and can be obtained commercially.

The structures of the compounds of Formula I of this invention are determined by their method of synthesis and can be corroborated by infra-red spectral analysis and by the correspondence of calculated and found values of elemental analyses of representative samples.

Effectiveness of the compounds of Formula I in the prevention and suppression of coccidiosis in poultry can be demonstrated as follows. The poultry are infected with one to nine genera of the coccidial species Eimeria. Compounds of Formula I are then administered to the poultry in the poultry feed at concentrations of 0.005–0.2 percent by weight. Effectiveness of the compounds of Formula I in preventing or suppressing the coccidial infections is measured by tallying mortality of the poultry and/or by counting upper intestinal and/or cecal lesions in the poultry at autopsy. These results are compared with the corresponding observations of infected poultry which receive no compound of Formula I in the poultry feed. Infected poultry treated with compounds of Formula I show lower mortality rates and/or fewer upper intestinal and/or cecal lesions than infected poultry not treated with compounds of Formula I.

The following examples illustrate my invention without limiting the latter thereto.

EXAMPLE 1

A. A solution of 5-nitro-2-furaldehyde (15.7 g., 0.111 mole), acetic acid (5 drops) and ethanol (50 ml.) was warmed to 60°C with vigorous stirring while a solution of benzenesulfonylhydrazide (19.0 g., 0.111 mole) in ethanol (50 ml.) at 60°C was rapidly added. Heating was continued at 70°C. The solid which separated when water (80 ml.) was added was collected by filtration. Recrystallisation of the solid from ethanol afforded 1-benzenesulfonyl-2-(5-nitrofurfurylidene)hydrazine, m.p. 160.4°–160.8°C with decomposition.

B. Alternatively a solution of 5-nitro-2-furaldehyde diacetate (26.8 g., 0.110 mole), benzenesulfonylhydrazide (19.0 g., 0.111 mole), sulfuric acid (9.0 ml.) and water (9.0 ml.) was heated under reflux. Recrystallisation of the resulting solid from ethanol afforded 1-benzenesulfonyl-2-(5-nitrofurfurylidene)hydrazine.

EXAMPLE 2

In Method A of Example 1 benzenesulfonylhydrazide can be substituted by α-toluenesulfonylhydrazide (prepared from α-toluenesulfonyl chloride and hydrazine, m.p. 127°–129°C). When this was done the product of the reaction was 1-(5-nitrofurfurylidene)-2-(α-toluenesulfonyl)hydrazine. It was recrystallized from methanol and had m.p. 181.5°–187.2°C with decomposition.

EXAMPLE 3

In Method A of Example 1 benzenesulfonylhydrazide can be substituted by p-fluorobenzenesulfonylhydrazide. When this was done the product of the reaction was 1-(p-fluorobenzenesulfonyl)-2-(5-nitrofurfurylidene)hydrazine, m.p. 157.4°–160.2°C with decomposition.

EXAMPLE 4

In Method A of Example 1 benzenesulfonylhydrazide can be substituted by p-chlorobenzenesulfonylhydrazide. When this was done the product of the reaction was 1-(p-chlorobenzenesulfonyl)-2-(5-nitrofurfurylidene)hydrazine, m.p. 154.0°–154.4°C with decomposition.

EXAMPLE 5

In Method A of Example 1 benzenesulfonylhydrazide can be substituted by 2,5-dichlorobenzenesulfonylhydrazide. When this was done the product of the reaction was 1-(2,5-dichlorobenzenesulfonyl)-2-(5-nitrofurfurylidene)hydrazine, m.p. 158.2°–158.6°C with decomposition.

EXAMPLE 6

In Method A of Example 1 benzenesulfonylhydrazide can be substituted by 3,4-dichlorobenzenesulfonylhydrazide. When this was done the product of the reaction was 1-(3,4-dichlorobenzenesulfonyl)-2-(5-nitrofurfurylidene)hydrazine, m.p. 162.2°–165.2°C with decomposition.

EXAMPLE 7

In Method A of Example 1 benzenesulfonylhydrazide can be substituted by p-bromobenzenesulfonylhydrazide. When this was done the product of the reaction was 1-(p-bromo-benzenesulfonyl)-2-(5-nitrofurfurylidene)hydrazine, m.p. 161.2°–164.8°C with decomposition.

EXAMPLE 8

In Method A of Example 1 benzenesulfonylhydrazide can be substituted by p-toluenesulfonylhydrazide. When this was done the product of the reaction was 1-(5-nitrofurfurylidene)-2-(p-toluenesulfonyl)hydrazine, m.p. 151.2°–152.0°C with decomposition.

I claim:

1. The method for the prevention and suppression of coccidiosis in poultry which comprises administering to the poultry in the poultry feed an effective amount of a compound of the formula

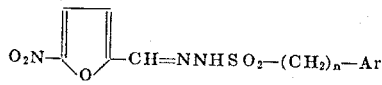

where $n$ is zero or one and where Ar is a member of the group consisting of phenyl and phenyl substituted by one to three members of the group consisting of halogen and lower alkyl of one to four carbon atoms.

2. The method for the prevention and suppression of coccidiosis in poultry which comprises administering to the poultry a compound according to claim 1, where $n$ is zero and Ar is phenyl substituted by one to three halogen atoms.

3. The method for the prevention and suppression of coccidiosis in poultry which comprises administering to the poultry a compound according to claim 1, where $n$ is zero and Ar is p-bromophenyl.

4. An anticoccidiosis composition comprising poultry feed containing from 0.005 to 0.2 percent by weight of a compound of the formula

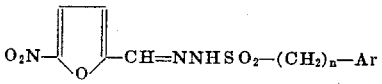

where $n$ is zero or one and where Ar is a member of the group consisting of phenyl and phenyl substituted by one to three members of the group consisting of halogen and lower-alkyl of one to four carbon atoms.

5. An anticoccidiosis composition comprising poultry feed containing from 0.005 to 0.2 percent by weight of a compound according to claim 4, where $n$ is zero and where Ar is phenyl substituted by one to three halogen atoms.

6. An anticoccidiosis composition comprising poultry feed containing from 0.005 to 0.2 percent by weight of a compound according to claim 4, where $n$ is zero and where Ar is p-bromophenyl.

* * * * *